United States Patent
Oishi

(10) Patent No.: US 9,342,813 B2
(45) Date of Patent: May 17, 2016

(54) APPARATUS AND METHOD FOR DISPLAYING LOG INFORMATION ASSOCIATED WITH A PLURALITY OF DISPLAYED CONTENTS

(75) Inventor: Kyoji Oishi, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 181 days.

(21) Appl. No.: 12/737,031

(22) PCT Filed: Jun. 13, 2008

(86) PCT No.: PCT/JP2008/001537
§ 371 (c)(1),
(2), (4) Date: Dec. 2, 2010

(87) PCT Pub. No.: WO2009/150702
PCT Pub. Date: Dec. 17, 2009

(65) Prior Publication Data
US 2011/0083093 A1    Apr. 7, 2011

(51) Int. Cl.
*G06F 3/048* (2013.01)
*G06Q 10/10* (2012.01)

(52) U.S. Cl.
CPC ...................... *G06Q 10/10* (2013.01)

(58) Field of Classification Search
CPC ........................... G06F 3/0484; G06F 3/04842
USPC ....................................... 715/772
See application file for complete search history.

(56) References Cited

U.S. PATENT DOCUMENTS 5,471,576 A * 11/1995 Yee ............................... 715/203
5,752,029 A *  5/1998 Wissner ........................ 715/202

(Continued)

FOREIGN PATENT DOCUMENTS

JP    11266446        9/1999
JP    11266446 A      9/1999

(Continued)

OTHER PUBLICATIONS

Albertsson, "Temporal debugging and profiling of multimedia applications", Proceedings of Multimedia Computing and Networking 2002, SPIE vol. 4673, pp. 196-207, 2002.*

(Continued)

*Primary Examiner* — Jennifer To
*Assistant Examiner* — Joseph R Burwell
(74) *Attorney, Agent, or Firm* — Arent Fox LLP

(57) ABSTRACT

The present invention relates to an apparatus for displaying log information, comprising: a receiving unit for receiving at least one content and correlation information; the correlation information including correlation that correlates each of a plurality of segments formed at a display and each of the at least one content outputted to the plurality of segments, an output unit for outputting the at least one content to the plurality of segments based on the correlation information; and a processor; wherein the processor is configured to generate the log information including segment information and content information, the log information representing content output history, the segment information identifying each of the plurality of segments, and the content information identifying each of the at least one content, extract part of the log information based on either of the segment information or the content information, and output the extracted log information.

23 Claims, 22 Drawing Sheets

(56) References Cited

U.S. PATENT DOCUMENTS

| | | | |
|---|---|---|---|
| 5,819,094 A * | 10/1998 | Sato et al. | 717/131 |
| 5,892,968 A * | 4/1999 | Iwasaki et al. | 710/1 |
| 6,724,918 B1 * | 4/2004 | Yen et al. | 382/113 |
| 2002/0083162 A1 * | 6/2002 | Oeda et al. | 709/223 |
| 2004/0041943 A1 * | 3/2004 | Fecht et al. | 348/441 |
| 2004/0073536 A1 * | 4/2004 | Smith-Semedo et al. | 707/2 |
| 2004/0148327 A1 * | 7/2004 | Satomi et al. | 709/200 |
| 2004/0148389 A1 * | 7/2004 | Satomi et al. | 709/224 |
| 2004/0220926 A1 | 11/2004 | Lamkin et al. | |
| 2005/0021701 A1 * | 1/2005 | Seki et al. | 709/223 |
| 2005/0278393 A1 * | 12/2005 | Huras et al. | 707/202 |
| 2006/0075308 A1 * | 4/2006 | Haselden et al. | 714/39 |
| 2008/0313156 A1 * | 12/2008 | Hirahara | 707/3 |
| 2010/0287579 A1 * | 11/2010 | Petrovic et al. | 725/9 |

FOREIGN PATENT DOCUMENTS

| | | |
|---|---|---|
| JP | 2004282647 A | 10/2004 |
| JP | 2007328423 A | 12/2007 |

OTHER PUBLICATIONS

Behera et al., "DocMIR: An automatic document-based indexing system for meeting retrieval", Multimedia Tools and Applications, vol. 37, pp. 135-167, Jun. 2007.*

Bertolotti, "Behavioral characterization for multimedia documents", PhD thesis, Dept. of Computer Science, Univ. of Turin, Nov. 2005.*

Bertolotti et al., "A study on multimedia documents behavior: a notion of equivalence", Multimedia Tools and Applications, vol. 33, pp. 301-324, Mar. 2007.*

Hunter et al., "Building and Indexing a Distributed Multimedia Presentation Archive Using SMIL", 5th European Conference on Research and Advanced Technology for Digital Libraries (ECDL 2001), Lecture Notes on Computer Science 2163, pp. 415-428, Sep. 2001.*

Little et al., "A tool for creating, editing, and tracking virtual SMIL presentations", Proceedings of the World Conference on Educational Multimedia, Hypermedia and Telecommunications, pp. 825-830, 2002.*

Daniel F. Zucker et al; "Open standard and open sources: SMIL for Interactivity", Interactions, Special Edition Open Source, Dec. 2007, pp. 41-46.

Search Report Dated March 6, 2009, International Search Report, PCT/JP2008/001537.

IPRP dated Dec. 13, 2010 with Written Opinion regarding PCT Application No. PCT/JP2008/001537.

Notice of Reasons for Rejection dated Nov. 20, 2012 regarding Japan Patent Application No. JP2010-547766.

PCT Publication No. WO/2009/150702 dated Dec. 17, 2009 regarding PCT Application No. PCT/JP2008/001537 with International Search Report dated Jun. 3, 2009.

Resubmission of Chinese and English Translation of First Office Action, dated Oct. 9, 2011, regarding Chinese Application No. CN200880129803.

Resubmission of Chinese and English Translation of Second Office Action, dated May 28, 2012, regarding Chinese Application No. CN200880129803.

European Office Action dated Jun. 30, 2015, regarding EP08764132.

* cited by examiner

Fig. 5

| RECORD NUMBER | TIME | OUTPUT HISTORY | | | |
|---|---|---|---|---|---|
| | | PRIORITY LEVEL | HISTORY | SEGMENT IDENTIFIER | CONTENT IDENTIFIER |
| ⋮ | ⋮ | ⋮ | ⋮ | ⋮ | ⋮ |
| 39 | 20071101 08:00 | notice | Output start | Seg001 | movie A |
| 40 | 20071101 08:00 | notice | Output start | Seg002 | text A |
| 41 | 20071101 08:00 | notice | Output start | Seg003 | picture A |
| ⋮ | ⋮ | ⋮ | ⋮ | ⋮ | ⋮ |
| 55 | 20071101 09:42 | error | File Not Found | Seg001 | movie A |
| ⋮ | ⋮ | ⋮ | ⋮ | ⋮ | ⋮ |
| 87 | 20071101 09:55 | notice | System notice | Seg001 | movie A |
| ⋮ | ⋮ | ⋮ | ⋮ | ⋮ | ⋮ |

106b

APPARATUS AND METHOD FOR DISPLAYING LOG INFORMATION ASSOCIATED WITH A PLURALITY OF DISPLAYED CONTENTS

This application claims the benefit, under 35 U.S.C. §365 of International Application PCT/JP2008/001537, filed Jun. 13, 2008, which was published in accordance with PCT Article 21(2) on Dec. 17, 2009 in English.

TECHNICAL FIELD

The present invention relates to displaying of log information indicating content output history.

BACKGROUND ART

In recent years, in various facilities such as training facilities and business facilities, there has been an increase in the requirement to output a combination of a number of different types of contents such as video sequences, still images, text, and audio at the same time. For example, a desire has arisen to output a number of contents to a single display at the same time in order to convey a greater amount of information to users such as customers and students at one time. There is also a desire arising to output audio and text data relating to video sequences at the same time in order to convey information to a user in a manner that is easy to understand and effective using both a sense of sight and a sense of hearing.

For example, an STB (Set Top Box) has been put forward as a way of meeting such requirements. An STB is a terminal device having a function that connects a server and a management computer terminal via a network, connects an output device via a cable, converts a plurality of image contents distributed by a server into signals capable of being watched and listened on an output device such as a display, and outputs the signals to the output device. The STB divides a display region of a display into a plurality of regions based on description language such as HTML (HyperText Markup Language) and outputs a plurality of contents accumulated on the server simultaneously at each region.

Methods exist of notifying the user of the occurrence of a malfunction by displaying a predetermined icon, video sequence, or message in the region for displaying the content for which the malfunction occurred on the display when a malfunction occurs for one of a plurality of content outputs.

It is difficult though in this case to give a notification that extends as far as the cause of the malfunction. Here, "malfunction" refers to cases where it is not possible to display an image because, for example, the data format or size of the image is different, or a file of the image cannot be obtained. When log information corresponding to the malfunction is displayed, the amount of log information generated by the various causes is vast. The causes therefore cannot be sufficiently displayed in the display region for the content. When log information is displayed as far as other display regions for contents, it becomes difficult to see the contents. Even if the log information can be displayed, specifying the log information that is wished to be referenced from the vast amount of log information is troublesome.

It is therefore the object of the present invention to provide an apparatus and method capable of easily displaying just the necessary portions of the output history of a plurality of displayed contents.

SUMMARY

According to a first aspect of the present invention, there is provided an apparatus (100) for displaying log information, comprising: a receiving unit (107) for receiving at least one content and correlation information; the correlation information including correlation that correlates each of a plurality of segments formed at a display (300) and each of the at least one content outputted to the plurality of segments, an output unit (105) for outputting the at least one content to the plurality of segments based on the correlation information; and a processor (101); wherein the processor is configured to generate the log information including segment information and content information, the log information representing content output history, the segment information identifying each of the plurality of segments, and the content information identifying each of the at least one content, extract part of the log information based on either of the segment information or the content information, and output the extracted log information.

According to the present invention, the log information indicating the content output history is generated so as to include segment information that identifies a segment, and content information that identifies a content. For example, when a video sequence is outputted at a certain segment, log information including segment information that identifies the segment where the video sequence is being outputted and content information that identifies the video sequence is generated. By using either of the segment information or the content information as a search key, log information is then extracted from the generated log information and outputted to the output device. As a result, when contents are outputted in parallel at a plurality of segments, the user can easily refer to log information for the content outputted at a desired segment or log information for the desired content from within a vast amount of log information.

In the scope of the claims and specification of the present invention, "segment" refers to a region formed at part of the entire display region of the display unit that is the output destination of a content. In the case of the picture-in-picture display format, it is also possible for one segment to be the entire display region of the display unit. Further, a "content" includes, for example, video sequences, still images, and text, etc.

According to a further aspect of the present invention, there is provided a method for displaying log information, comprising steps of: receiving at least one content and correlation information; the correlation information including correlation that correlates each of a plurality of segments formed at a display and each of the at least one content outputted at the plurality of segments, outputting the at least one content to the plurality of segments based on the correlation information; generating the log information including segment information and content information, the log information representing content output history, the segment information identifying each of the plurality of segments, and the content information identifying each the at least one content; extracting (S15) part of the log information based on either of the segment information or the content information; and outputting (S16) the extracted log information.

According to the present invention, when contents are outputted in parallel at a plurality of segments, the user can easily refer to log information for the content outputted at a desired segment or log information for the desired content from within a vast amount of log information.

According to a still further aspect of the present invention, there is provided a program for causing a computer to execute the steps of: receiving at least one content and correlation information; the correlation information including correlation that correlates each of a plurality of segments formed at a display and each of the at least one content outputted at the plurality of segments, outputting the at least one content to the plurality of segments based on the correlation information; generating the log information including segment information and content information, the log information representing content output history, the segment information identifying each of the plurality of segments, and the content information identifying each of the at least one content; extracting (S15) part of the log information based on either of the segment information or the content information; and outputting (S16) the extracted log information.

According to the present invention, when contents are outputted in parallel at a plurality of segments, the user can easily refer to log information for the content outputted at a desired segment or log information for the desired content from within a vast amount of log information.

According to a still further aspect of the present invention, there is provided a system (10) for displaying log information, comprising: a correlation generating unit for generating correlation information that correlates each of a plurality of segments formed at a display (300) and each of at least one content outputted to the plurality of segments; an output unit (105) for outputting the at least one content to the plurality of segments based on the correlation information; and a processor (101); wherein the processor is configured to generate the log information including segment information and content information, the log information representing content output history, the segment information identifying each of the plurality of segments, and the content information identifying each of the at least one content, extract part of the log information based on either of the segment information or the content information, and output the extracted log information.

According to the present invention, when contents are outputted in parallel at a plurality of segments, the user can easily refer to log information for the content outputted at a desired segment or log information for the desired content from within a vast amount of log information.

Advantageous Effects

According to the present invention, it is possible to easily refer to necessary portions of content output history even when a plurality of contents are outputted in parallel at a display.

BRIEF DESCRIPTION OF THE DRAWINGS

FIG. 5 is a view illustrating an example of log information stored in a log DB.

EXPLANATION OF REFERENCE

10 Log information system
100 Multimedia terminal
101 CPU
101*a* Correlation unit
101*b* Content output unit
101*c* Log generating unit
101*d* Log extracting unit
101*e* Log display unit
106 Hard disc drive (HDD)
106*a* Correlation table
106*b* Log DB
200 Server
300 Display
400 Network
500 Cable
600 Operation unit

BEST MODE FOR CARRYING OUT THE INVENTION

First Embodiment

1. Overall System

Figure 1:
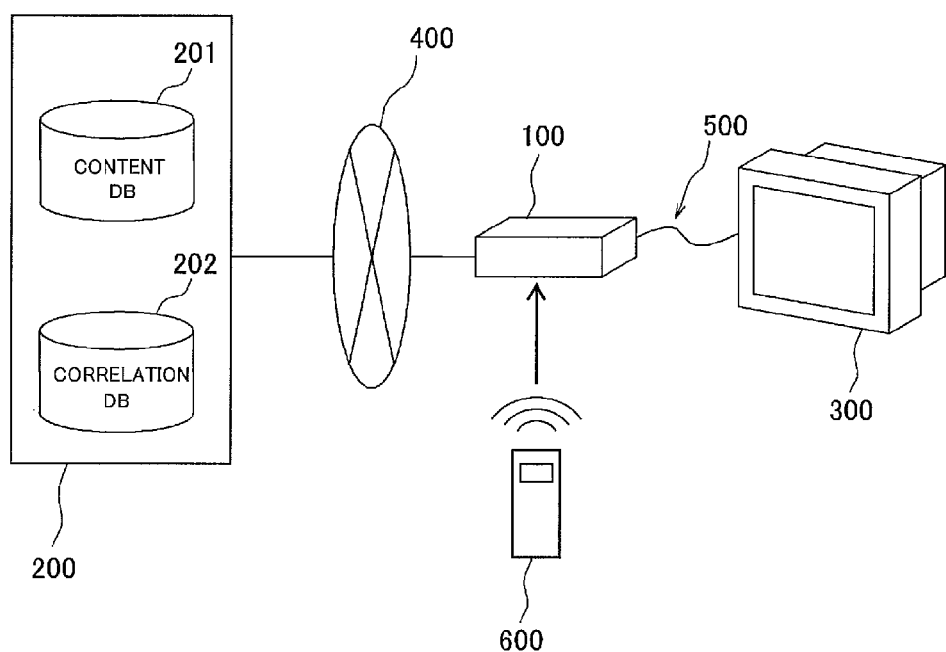
FIG. 1 is a view showing an overall configuration for a log information display system in accordance with a first embodiment of the present invention.

FIG. 1 is a view showing an overall configuration for a log information display system in accordance with a first embodiment of the present invention.

Referring to FIG. 1, the log information system 10 includes a multimedia terminal 100, a server 200 connected to the multimedia terminal 100 via a network 400 such as the Internet, a display 300 connected to the multimedia terminal 100 via a cable 500, and an operation unit 600 that generates an operation signal indicating the results of a user operation and outputs the operation signal to the multimedia terminal 100.

The multimedia terminal 100 is a terminal that outputs a plurality of contents to a plurality of different segments at the display 300. Various types of data that can be sensed by sight such as video sequences, still images, and text are included in the contents. In the first embodiment, the contents are taken to be video sequences, still images, and text, for ease of description. In the first embodiment, a segment refers to each display region formed at part of the entire display region of the display that is the output destination of each of the contents. Segment information is information that identifies each of the segments, and is referred to in the first embodiment as a segment identifier. Segment identifiers can be allocated dynamically or can be fixed.

The multimedia terminal 100 is, for example, an STB, that outputs the contents distributed from the server 200 to the display 300. Although only one multimedia terminal 100 is shown in FIG. 1, it is also possible for a plurality of multimedia terminals 100 to be connected to the server 200, with displays 300 then being connected to each of the plurality of multimedia terminals 100.

The server 200 has a content DB 201 and a correlation DB 202. The content DB 201 stores content information and the contents in a correlated manner. The content information is information that identifies each of the contents and is referred to in the first embodiment as a content identifier. For example, a file name or URL (Universal Resource Locator) can be used as a content identifier. The correlation DB 202 stores correlation data that correlates the content identifiers, the segment identifiers, and the content output time. The content DB 201 and the correlation DB 202 do not have to be at the server 200 and can also be, for example, within the multimedia terminal 100.

2. Multimedia Terminal

<<Hardware Configuration of Multimedia Terminal>>

Figure 2:
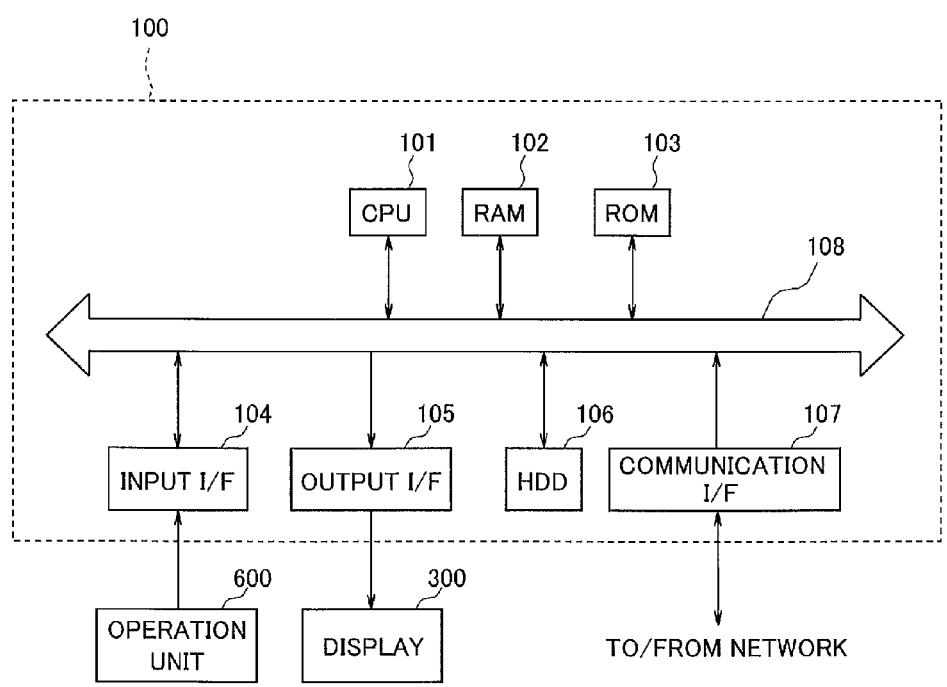
FIG. 2 is a block diagram showing a hardware configuration for a multimedia terminal in accordance with the first embodiment of the present invention.

FIG. 2 is a block diagram showing a hardware configuration for the multimedia terminal 100 in accordance with the first embodiment of the present invention.

Referring to FIG. 2, in this example, the multimedia terminal 100 has a CPU 101, a RAM 102, a ROM 103, an input interface 104, an output interface 105, a hard disc drive (HDD)106, a communication interface 107, and a bus 108 that connects these elements together.

The CPU 101 executes a control program recorded in the ROM 103 and controls the overall operation of the multimedia terminal 100. The CPU 101 may be a processor, and a circuit incorporating a processing circuit such as an MPU, a GPU, and a DSP, etc. may be used for a processor other than a CPU. A processor may be a general purpose processor, or a built-to-order processor, for example ASIC (Application Specific Integrated Circuit). The RAM 102 functions as a work area for executing programs. The ROM 103 stores a control program and preset parameters, etc. The input interface (I/F in the drawings) 104 receives an operation signal indicating the results of user operations of the operation unit 600 such as a remote controller and a keyboard, etc. and supplies an operation signal to the CPU 101 via the bus 108. The output interface (I/F in the drawings) 105 supplies contents to output equipment such as the display 300. The HDD 106 stores the contents and correlation data supplied via a read-out bus 108 from the server 200. The communication interface (I/F in the drawings) 107 sends and receives data to and from the server 200 via a network.

<<Functional Configuration of Multimedia Terminal>>

Figure 3:
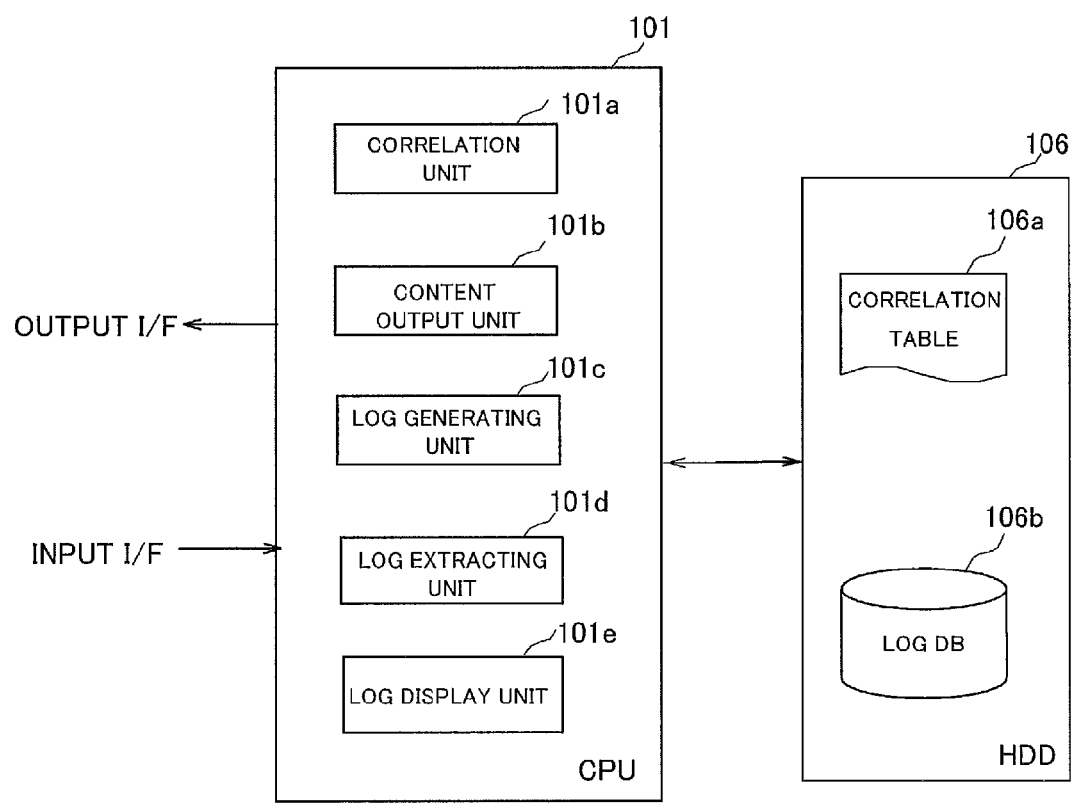
FIG. 3 is a block diagram showing a functional configuration for a multimedia terminal in accordance with the first embodiment of the present invention.

FIG. 3 is a block diagram showing a functional configuration of the multimedia terminal 100.

Referring to FIG. 3, by executing a program, the CPU 101 of the multimedia terminal 100 is caused to function as a correlation unit 101*a*, content output unit 101*b*, log generating unit 101*c*, log extracting unit 101*d*, and log display unit 101*e*. The HDD 106 of the multimedia terminal 100 has a correlation table 106*a* and a log DB 106*b*. The CPU 101 carries out processing based on the data on the HDD 106. First, the data on the HDD 106 is described, and then each function of the CPU 101 is described.

(1) Data on HDD (1-1) Correlation Table

Figure 4:
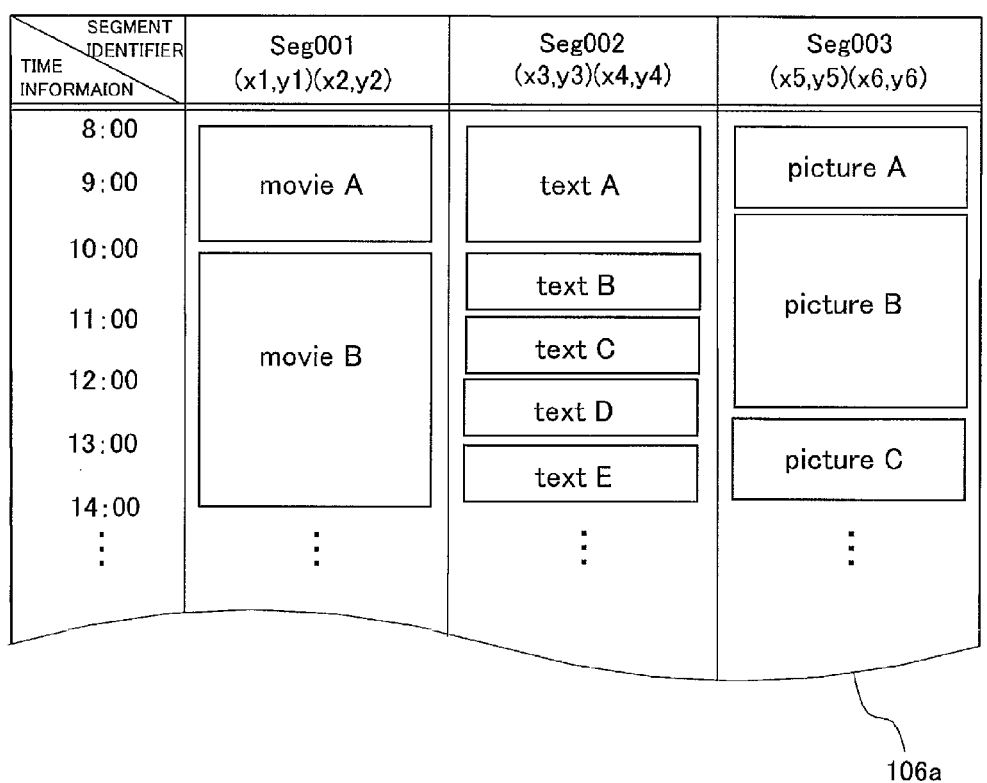
FIG. 4 is a view illustrating an example of a correlation table.

FIG. 4 is a view illustrating an example of a correlation table.

Referring to FIG. 4, the correlation table 106*a* stores correlation data acquired from the server 200 (FIG. 1). The correlation table 106*a* is stored in the HDD 106. The correlation table 106*a* can also be stored in the RAM 102.

At least the "segment identifier" and the "content identifier" are correlated at the correlation table 106*a*. At the correlation table 106*a*, it is also possible to correlate other information in addition to the segment identifier and the content identifier. In this example, content "output time" is further correlated. The correlation table 106*a* of FIG. 4, for example, correlates the content identifier "movie A" between 8:00 and 9:59 with the segment identifier "Seg001", and correlates the content identifier "movie B" between 10:00 and 13:59 with the segment identifier "Seg001".

In this example, the output time is shown using absolute time information but this is by no means limited. For example, the output time can be time information indicating relative time based on when the output of the content identifier "movie A" starts, so that the start time of content to be outputted next can be shown based on the relative time information.

Further, with the correlation table 106*a* of this example, the segment identifier and the coordinates indicating the segment display region are correlated. The segment display region is a display region that is part of the display 300 in this example. Each display region can be described by, for example, coordinates (x, y, z). In the first embodiment, the case where display regions of each two-dimensional segment displayed using coordinates (x, y) do not overlap and do not change with time is shown to simplify the description. However, even if the display regions for each segment do overlap, display regions for each segment in this case can be shown using three-dimensional coordinates (x, y, z). Further, it is also possible to store a correlation of the segment ID and the coordinates separate from the correlation table 106*a*.

The correlation table 106*a* can be, for example, described using description language such as, for example, SMIL (Synchronized Multimedia Integration Language) or HTML (Hypertext Markup Language). A plurality of contents are outputted to each of segments based on the correlation data described using SMIL etc. An output example is described in the following using "(2-2) content output unit"

(1-2) Log DB

FIG. 5 is a view illustrating an example of log information stored in the log DB.

Referring to FIG. 5, log information is stored in the log DB 106*b* and is a history of content outputted by the content output unit 101*b*. The log information is written in by the log generating unit 101*c*. The log information correlates at least the "segment identifier", the "content identifier", and the "history". In this example, the log information includes a "record number", "time", "priority level", "history", "segment identifier", and "content identifier" within one record.

The "record number" is an arbitrary number for identifying each record. The "time" is time information that indicates when the log information is generated. The "priority level" indicates a degree of importance of each record included in the output history of content outputted by the content output program. In the first embodiment, the priority level is indicated, in order from low priority, as "information", "notice", "warning", "error", and "critical". "History" is a text message indicating the operation state of the output program generated by the content output program. For example, when a content file to be outputted cannot be found, a message "File Not Found" is written to the history. "Segment identifier" is information that identifies a segment. "Content identifier" is information that identifies a content.

Time information included in the log information can be a time of the occurrence of an event that causes information to be logged. Log information can include not only the above information, but also other information including, for example, program operation information. It is also possible to give messages indicating starting up or ending of a program, indicating the log history of a user, or indicating that equipment is operating normally as the program operation information.

(2) Functional Units of the CPU (2-1) Correlation Unit

Returning to FIG. 3, the correlation unit 101a correlates a plurality of segments in the display 300 and the contents outputted at each of the segments. In the first embodiment, the correlation unit 101a acquires correlation data correlating the content identifiers, the segment identifiers, and the content output time from the server 200 for storage in the correlation table 106a. The timing of acquisition of the correlation data is by no means limited and can, for example, occur at predetermined intervals or occur at predetermined days and times. The correlation unit 101a can also acquire the correlation data at an arbitrary timing from the server 200 using a push method.

(2-2) Content Output Unit

[[Content Output]]

The content output unit 101b acquires each of the contents from the server 200 for output to each of segments based on the correlation data included in the correlation table 106a. The segments and times for outputting contents are segments and output times specified by the correlation data. The content output unit 101b is realized on CPU 101 by one or a plurality of output programs. For example, a web browser, email, a video sequence output program, or an audio output program can be given as output programs.

Figure 6:
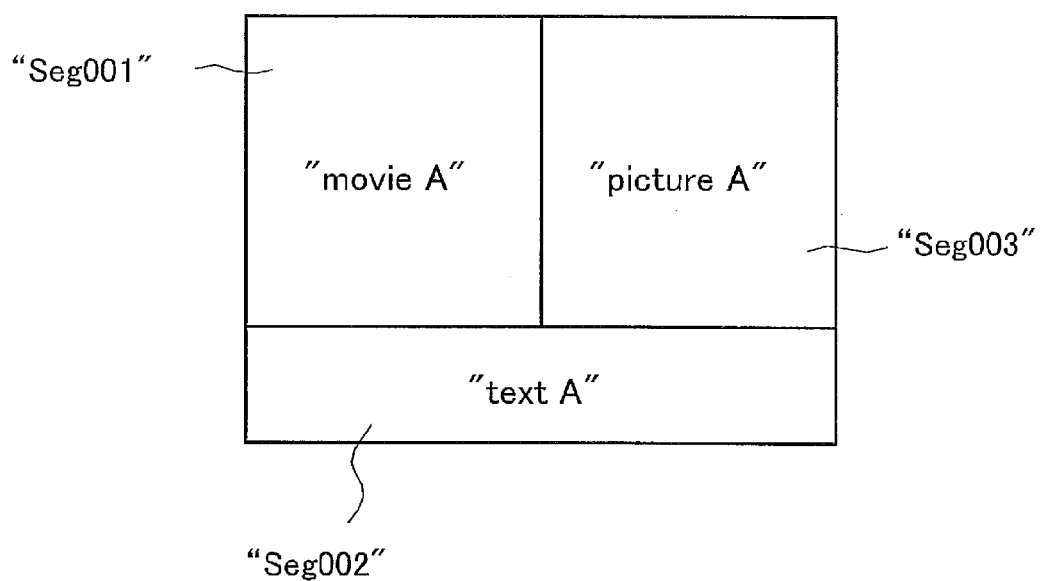
FIG. 6 is an example screen for outputting a plurality of contents.

FIG. 6 is an example screen for the display 300 outputting a plurality of the contents.

Referring to FIG. 6, in this example, the display region of the display 300 is divided into three so as to form three segments. Each segment is identified by segment identifiers "Seg001", "Seg002", and "Seg003". In the following, the segments are referred to simply as segment "Seg001", segment "Seg002", and segment "Seg003". A video sequence specified using content identifier "movie A" is displayed at segment "Seg001". Text data of content identifier "text A" is displayed at the segment "Seg002". A still image of content identifier "picture A" is displayed at the segment "Seg003". In the following these are simply referred to as content "movie A", content "text A", and content "picture A".

[[Log Generating Designation]]

Each of the output programs of the content output unit 101b passes over output history for the contents to the log generating unit 101c in parallel with the content output processing. The output history that the content output unit 101b passes over to the log generating unit 101c includes at least "history", "segment identifier", and "content identifier". The data included in the output history is by no means limited to this example and can include, for example, "priority level", "history", "segment identifier", and "content identifier". "Priority level", "history", "segment identifier", and "content identifier" are the same as for the log information.

Further, the content output unit 101b can also designate recording rules for the log generating unit 101c using the priority levels described above. The passed over output history is written to the log DB 106b in accordance with the designated recording rules. For example, output history of a predetermined priority level or higher is written to the log DB 106b. Further, for example, it is also possible for the content output unit 101b to display output history having a priority level of "critical" desired by the user on the screen, and designate the writing of output history having another priority level of "error" to the log generating unit 101c.

It is preferable for a message indicating the "priority level", such as, for example, "information", "notice", "warning", "error", or "critical" to be shared by each of the output programs. It is also straightforward for the log extracting unit 101d to extract log information of a predetermined priority level or higher. However, it is also possible to use a different message for each output program. The text message described in the "history" depends on each output program.

[[Display of Malfunction]]

Figure 7:
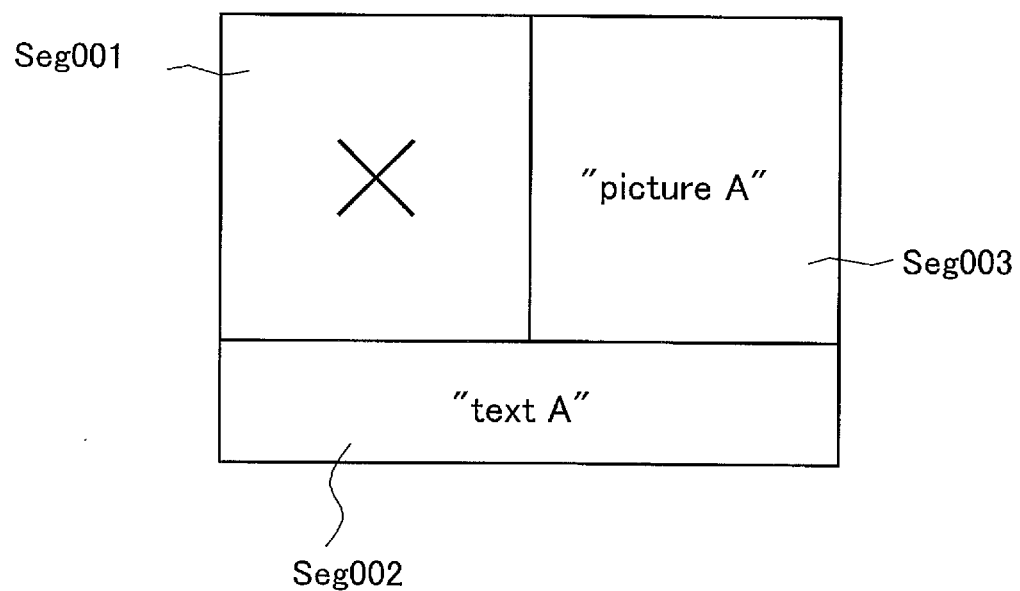
FIG. 7 is an example screen for when a malfunction occurs during the output of content.

FIG. 7 is an example screen for the case where the output for content "movie A" malfunctions at the segment "Seg001" of FIG. 6.

Referring to FIG. 7, in this example, the output program switches over the segment "Seg001" from an output screen for the content "movie A" to a still image displaying a malfunction mark "x". When a malfunction occurs in the output for the content, each output program outputs a predetermined notification to the segment corresponding to the content. The predetermined notification can include a predetermined video sequence, a still image, a text image, or a combination of such images, and depends on each output program. A malfunction can be deterioration in picture quality, or stopping of the outputting of a content, etc. A malfunction occurs, for example, when a content cannot be found at the server 200 or when the receipt of data is delayed as a result of packet loss on the network 400. There are various causes of malfunction such depending on the output program for the content or the operating environment of the multimedia terminal 100.

(2-3) Log Generating Unit

Returning to FIG. 3, the log generating unit 101c generates the log information and writes the log information to the log DB 106b in response to the output history passed over from the content output unit 101b and the designation of recording rules. In the first embodiment, the log generating unit 101c further writes time information that indicates when the log information is generated to the log DB 106b together with the output history.

The log generating unit 101c can be implemented using, for example, syslog. It is also possible to generate log information using an independent mechanism depending on each output program without using the syslog as the log generating unit 101c.

(2-4) Log Extracting Unit

The log extracting unit 101d extracts part of the log information stored in the log DB 106b and outputs the extracted log information to the log display unit 101e. The extraction of the log information is carried out based on either the segment identifier or the content identifier. The log extracting unit 101d can extract log information based on either a segment identifiers or a content identifiers, and time information generated by the log information. In the first embodiment, the log extracting unit 101d extracts log information based on a segment identifier.

[[Confirmation Window]]

Figure 8:
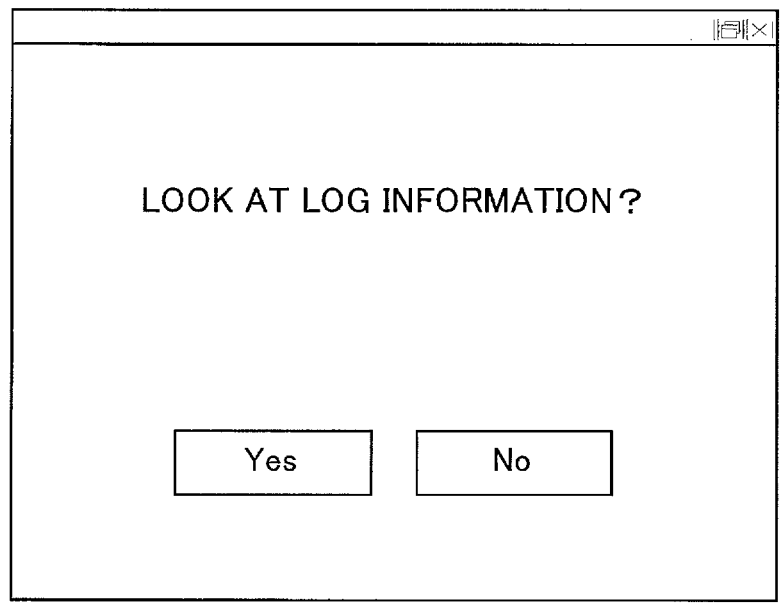
FIG. 8 shows an example of a confirmation window.

FIG. 8 shows an example of a "confirmation window" displayed by the log extracting unit 101d.

Referring to FIG. 8, the "confirmation window" is for the user to select whether or not to display log information. For example, when the operation unit 600 (refer to FIG. 2) is a remote controller, display of the "confirmation window" is designated as a result of the user pressing down a predetermined button provided at the remote controller. When "yes" is clicked in the "confirmation window", the log extracting unit 101d displays the "segment designation window" described in the following. An example is given of the timing of displaying the "confirmation window" that is the time of receiving a predetermined input operation by the user via the operation unit 600 in a state where a malfunction has occurred (refer to FIG. 7).

[[Segment Designation Window]]

Figure 9:
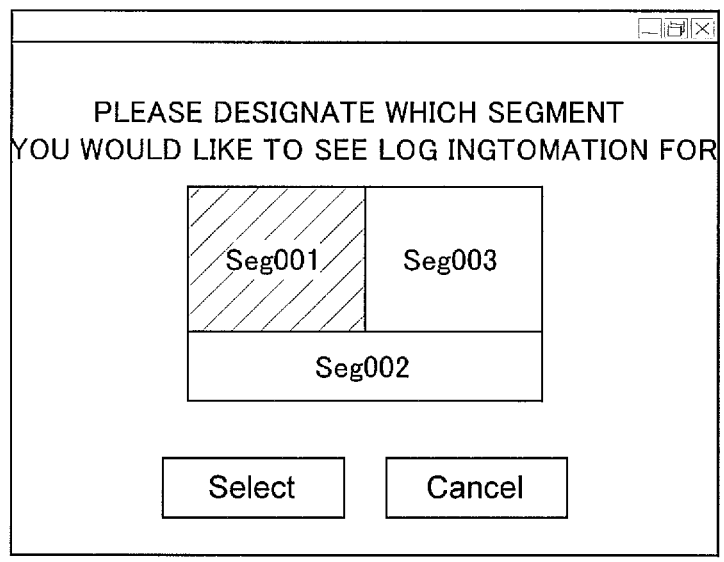
FIG. 9 shows an example of a segment designation window.

FIG. 9 shows an example of a "segment designation window" displayed by the log extracting unit 101d.

Referring to FIG. 9, the "segment designation window" receives a segment identifier designation from the user. For example, when the operation unit 600 (refer to FIG. 2) is a remote controller, designation for a segment identifier takes place as a result of the user pressing down a predetermined button provided at the remote controller. In this example, a situation is shown where segment "Seg001" is designated. Before displaying the "segment designation window", the log extracting unit 101d refers to the correlation table 106a and reads out at least the segment identifiers. The log extracting unit 101d then displays the "segment designation window" based on the read-out information and receives the segment identifier designation. For example, the log extracting unit 101d displays a segment identifier list and receives designation for any of the segment identifiers. Further, the log extracting unit 101d can also, for example, specify the designated segment identifier by receiving a designation for the segment position.

If a segment arrangement is displayed in the segment designation window and a segment position designation is received, it can be anticipated that it will be easy for the user to visualize the segment designation. When the arrangement of each segment does not change with time, it is preferable to create a designation window indicating the arrangement of the display region for the segments in advance. If each display region and segment identifier is made to correlate at the segment designation window, it is possible to specify the segment identifier based on the designated display region. When the arrangement of the segments changes with time, it is possible to read out coordinates indicating the display regions for the segments from the correlation table 106a. It is then possible to display the arrangement of the segments at the segment designation window based on the read-in coordinates, and it is possible to specify the segment identifiers based on the designated display region.

Figure 10:
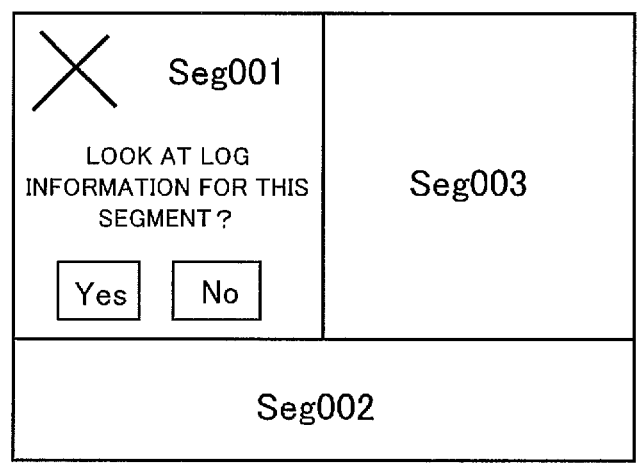
FIG. 10 shows an example of a screen that combines a predetermined notification indicating a malfunction, a confirmation window, and a segment designation window.

The "confirmation window" and "segment designation window" displayed by the log extracting unit 101d are not limited to these examples. The log extracting unit 101d can also display, for example, a still image serving as the predetermined notification indicating a malfunction, the "confirmation window", and the "segment designation window" as shown in FIG. 10.

(2-5) Log Display Unit

Returning to FIG. 3, the log display unit 101e receives the extracted log information from the log extracting unit 101d for output and display at the display 300.

[[Log Window]]

Figure 11A:
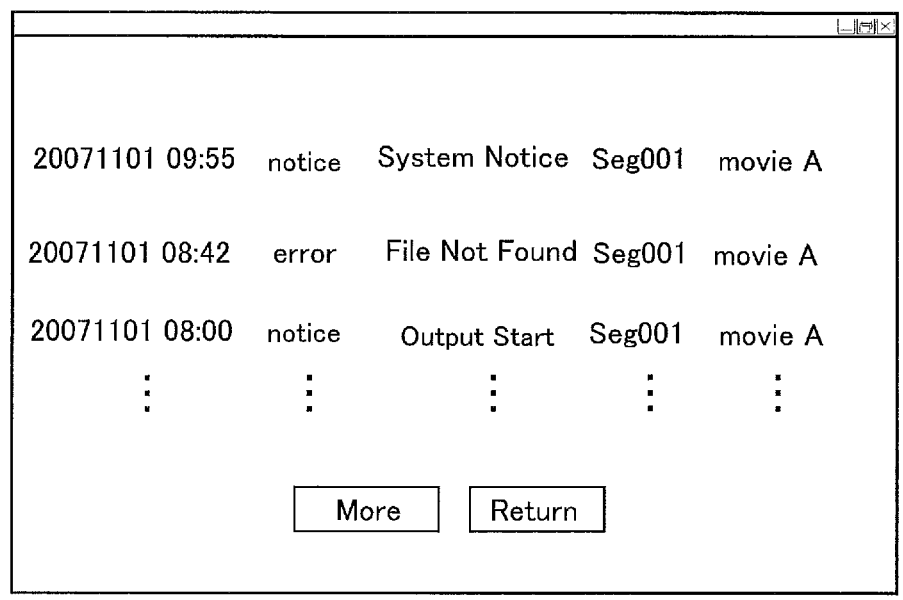
FIG. 11A shows an example of a log window.
Figure 11B:
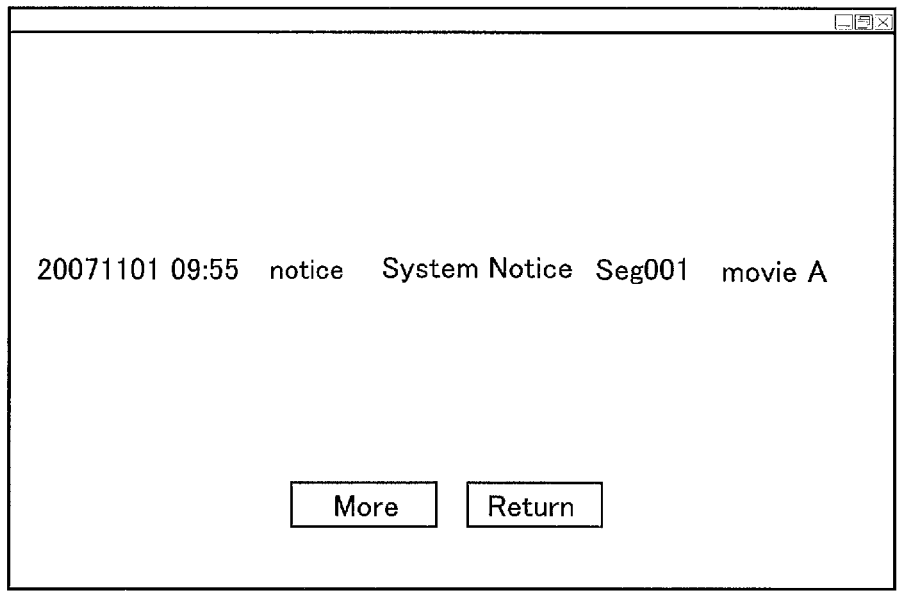
FIG. 11B shows a further example of a log window.

FIG. 11A and FIG. 11B show examples of log windows displayed by the log display unit 101e.

Referring to FIG. 11A and FIG. 11B, the log display unit 101e extracts records including at least the designated segment identifier from the log information stored in the log DB 106b and displays the extracted records. FIG. 11A is an example of displaying some of a plurality of records including designated segment identifiers. FIG. 11B is an example of displaying the newest record containing the specified segment identifier. Further, the log display unit 101e can also display all of the records containing at least the specified segment identifier.

In this example, the log display unit 101e extracts records based on the specified segment identifier. It is possible to selectively extract just log information for the designated segments by extracting records using the segment identifier as a search key. In the example in FIG. 11A, the log display unit 101e displays "time", "priority level", "history", "segment identifier", and "content identifier" of each of the extracted records in order of newest. When the "More" button is selected in FIG. 11A and FIG. 11B, older log information is displayed.

<<Processing Carried Out by the Multimedia Terminal>>

Figure 12:
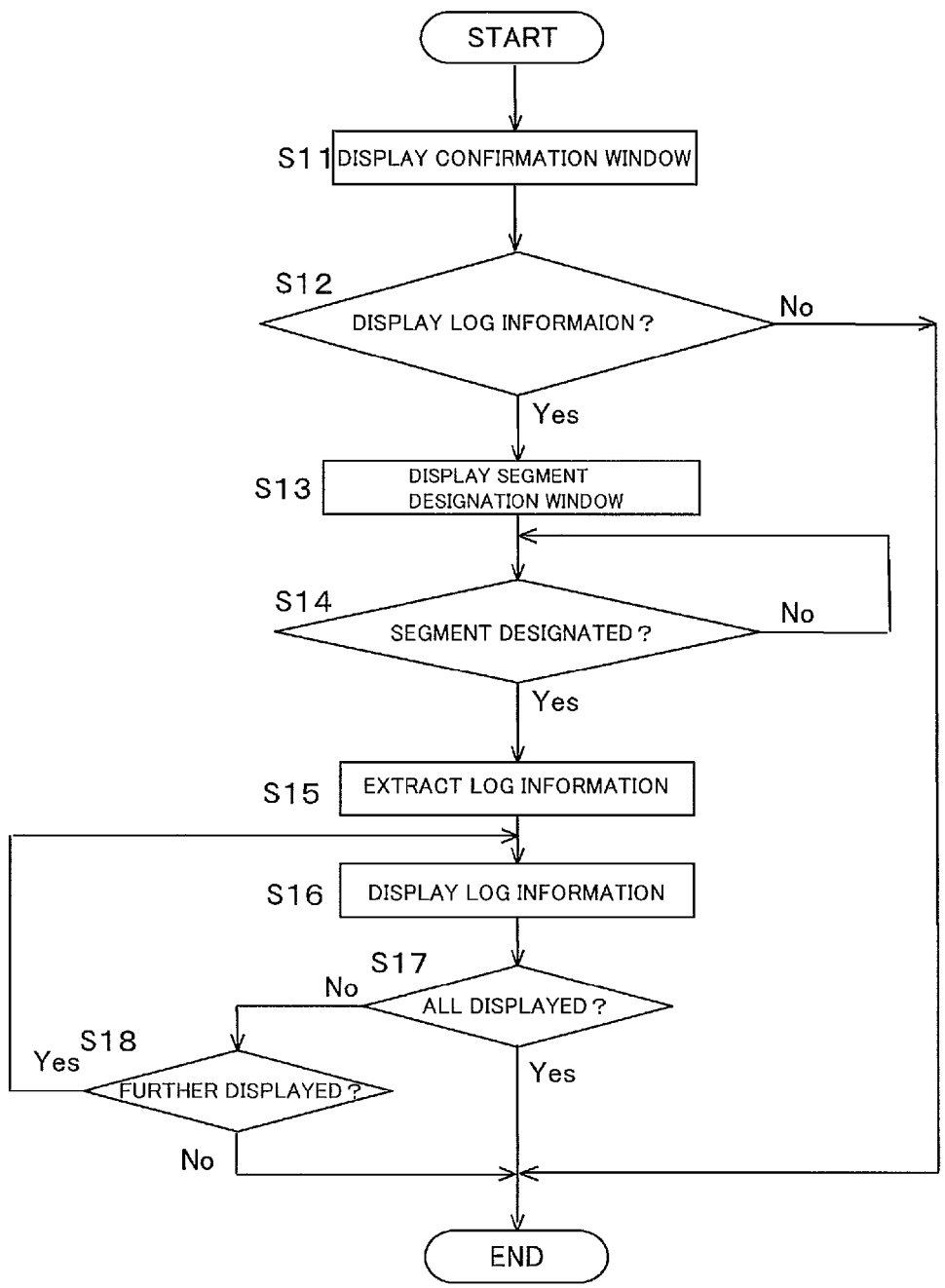
FIG. 12 is a flowchart showing an example of a flow of log information display processing executed by a CPU.

FIG. 12 is a flowchart of an example of a flow for log information display processing executed by the log extracting unit 101d and the log display unit 101e of the CPU 101. In the following, the log information display processing is described with reference to FIG. 12. This processing commences when the display of log information is designated by the user via the operation unit 600 (refer to FIG. 2) in a situation where there is a malfunction in the output of any of the content outputs.

In step S11 to S12, the log extracting unit 101d displays the "confirmation window" shown in FIG. 8 at the display 300 (S11) and receives an instruction as to whether or not to display the log information (S12). For example, when the operation unit 600 (refer to FIG. 2) is a remote controller, display of the "confirmation window" is designated as a result of pressing down of a predetermined button provided at the remote controller. When "Yes" is selected at the "confirmation window", i.e. when it is selected to display log information, step S13 is proceeded to. When "No" is selected at the "confirmation window", this processing ends.

In step S13 to S14, the log extracting unit 101d displays the "segment designation window" shown in FIG. 9 (S13) and awaits the designation of the segment identifier (S14). For example, before displaying the "segment designation window", the log extracting unit 101d refers to the correlation table 106a and reads out at least the segment identifiers. The log extracting unit 101d then displays the "segment designation window" based on the read-out information. When the segment identifier is designated, step S15 is proceeded to. For example, when the operation unit 600 (refer to FIG. 2) is a remote controller, the segment identifier designation takes place as a result of the user pressing down a predetermined button provided at the remote controller.

In step S15, the log extracting unit 101d extracts records including the specified segment identifier from the log information stored in the log DB 106b for output to the log display unit 101e.

In step S16, the log display unit 101e receives the records extracted by the log extracting unit 101d and outputs log information at the display 300. The log display unit 101e can display some of the information for records containing the segment identifier as shown in FIG. 11A or can display only the newest records containing the segment identifier designated as shown in FIG. 11B. Further, the log display unit 101e can also display all of the records containing at least a specified segment identifier.

In step S17 to S18, when there are records of the extracted records that have not-yet been displayed (S17), the log display unit 101e displays the not-yet-displayed records based on the user instructions (S18, S16). For example, there are cases where the "More" button in FIG. 11A and FIG. 11B is pressed down. When there is an explicit designation from the user after displaying all or some of the extracted records (S17, S18), this processing ends. For example, there are cases where the "Return" button is pressed at the log window of FIG. 11A and FIG. 11B.

According to the first embodiment, the log information that is the content output history is generated so as to include at least segment information that identifies a segment, and content information that identifies a content. The multimedia terminal 100 receives a designation of the segment information by the user and selectively extracts log information containing the specified segment information from the log DB 106b for output to the display 300. When the contents are outputted in parallel at a plurality of segments respectively, the user can refer to log information for the content outputted at the desired segment selectively from within a vast amount of log information.

Second Embodiment

In a second embodiment, the log extracting unit of the multimedia terminal extracts log information based on content information that identifies a content. Other aspects of the configuration of the second embodiment are the same as for the first embodiment. In the second embodiment, the content information is referred to as a content identifier.

Figure 13:
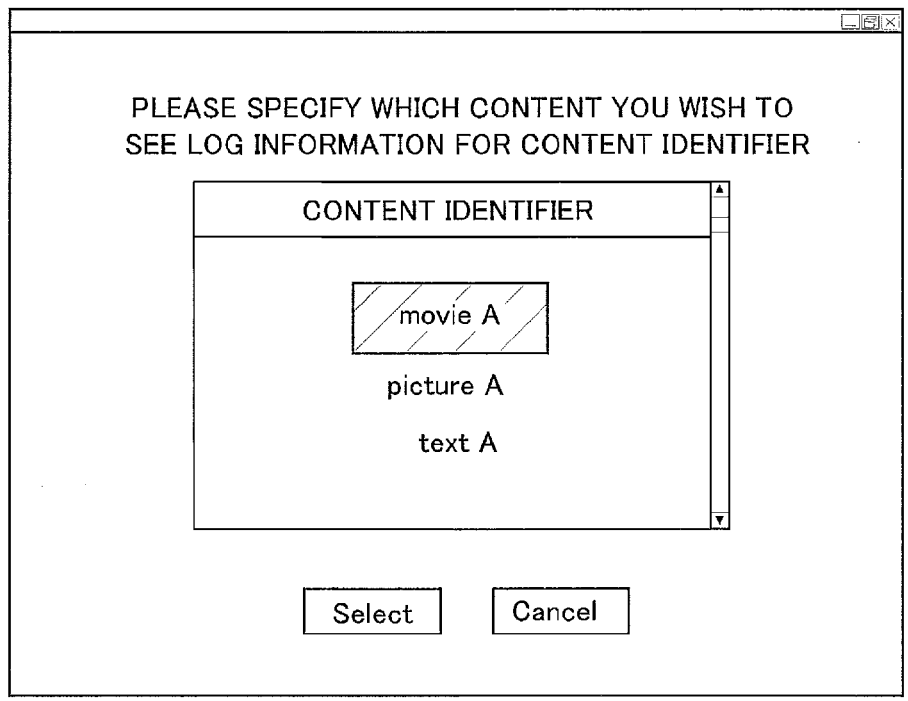
FIG. 13 shows an example of a content designation window in accordance with a second embodiment of the present invention.

FIG. 13 shows an example of a "content designation window" displayed by the log extracting unit 101d.

Referring to FIG. 13, the log extracting unit 101d displays a list of content identifiers that are currently being outputted and receives a designation for any of the content identifiers. In this example, the situation is shown where content identifier "movie A" is designated. Before displaying the "content designation window", the log extracting unit 101d refers to the correlation table 106a and reads out the content identifiers. If a description is given using the correlation table 106a shown in FIG. 4, if the current time is between "8:00 to 9:30", the content identifiers "movie A", "test A", and "picture A" can be read out. Further, if, for example, the current time is between "9:30 to 10:00", the content identifiers "movie A", "test A", and "picture B" can be read out. The log extracting unit 101d displays a list of the content identifiers based on the read-out information and receives a designation for any of the content identifiers. The "content designation window" displayed by the log extracting unit 101d is by no means limited to this example.

Figure 14:
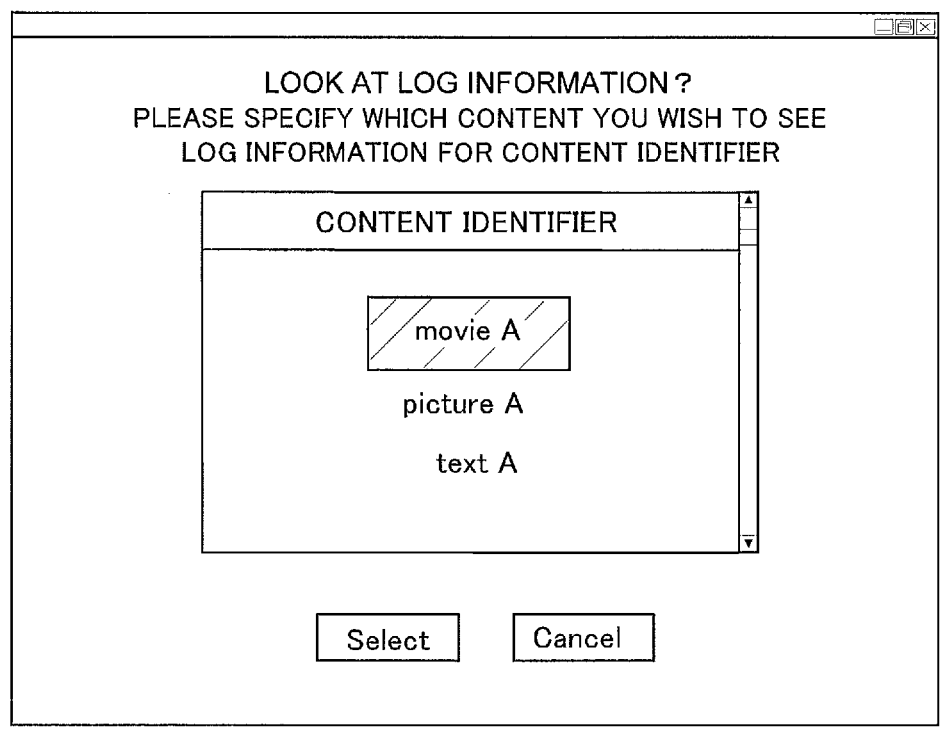
FIG. 14 shows an example of a screen where a confirmation window and a content designation window are combined in accordance with the second embodiment of the present invention.

FIG. 14 shows an example of a screen where the "confirmation window" and the "content designation window" are combined.

Referring to FIG. 14, the log extracting unit 101d can also display a still image that combines the "confirmation window" and the "content designation window".

According to the second embodiment, the multimedia terminal 100 generates the log information that is the content output history so as to include at least segment information that identifies a segment, and content information that identifies a content. The multimedia terminal 100 receives a designation of the content information from the user and selectively extracts log information including the specified content information from the log DB 106b for output to the display 300. It is therefore possible for the user to selectively refer to the desired log information from a vast amount of log information even when a plurality of contents are outputted in parallel at a plurality of segments.

Third Embodiment

In a third embodiment, the log extracting unit of the multimedia terminal extracts log information based on time information that indicates when the log information is generated in addition to segment information that identifies a segment. Other aspects of the configuration of the third embodiment are the same as for the first embodiment.

Figure 15:
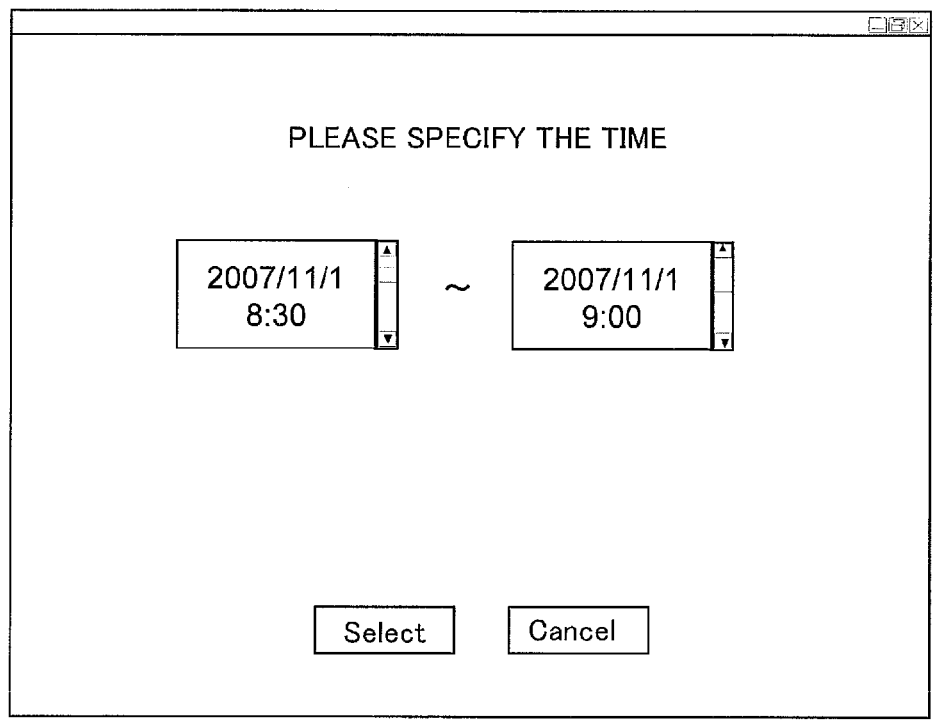
FIG. 15 shows an example of a time designation window displayed by a log extracting unit in accordance with a third embodiment of the present invention.

FIG. 15 shows an example of a "time designation window" displayed by the log extracting unit 101d.

Referring to FIG. 15, the log extracting unit 101d receives a designation for the time information that indicates when the log information is generated. The "time designation window" can be displayed, for example, after designating the segment at the "segment designation window" shown in FIG. 9. Here, the case is considered where the log extracting unit 101d displays the "time designation window" after the segment "Seg001" is designated. In FIG. 15, at the "time designation window", a situation is shown where 8:30 to 9:00 is designated as the time when the log information is generated. For example, when the operation unit 600 (refer to FIG. 2) is a remote controller, the time information designation takes place as a result of the user pressing down a predetermined button provided at the remote controller. The "time designation window" displayed by the log extracting unit 101d is not limited to this example, and can also be a screen enabling selection of time information for the log information.

Figure 16:
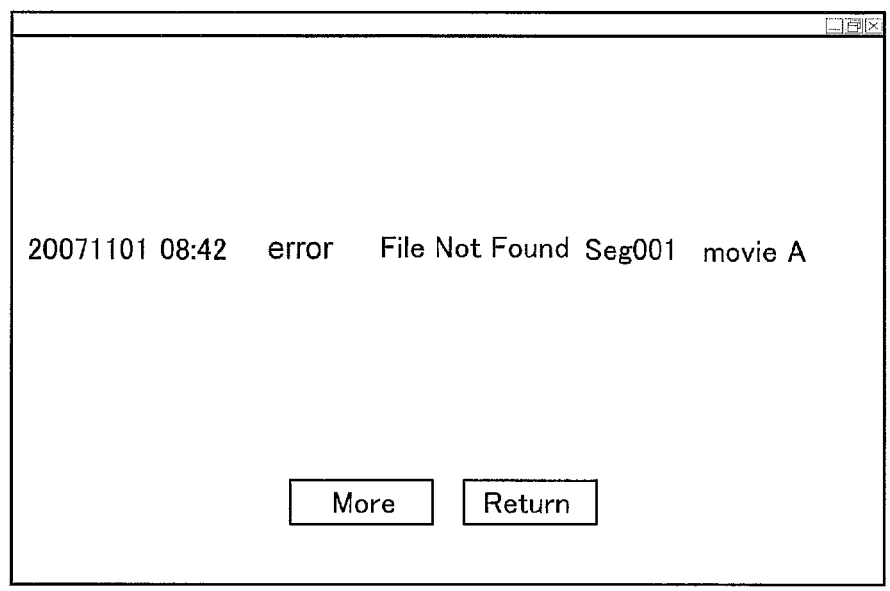
FIG. 16 shows an example of a log window in accordance with a third embodiment of the present invention.

The log extracting unit 101d extracts records of log information generated between 8:30 and 9:00 that include the segment identifier "Seg001" from within the log information of the log DB 106b. FIG. 16 shows an example of a log window displayed by the log display unit 101e. Referring to FIG. 16, the log display unit 101e outputs log information based on the extracted records and displays the log information at the display 300.

In this example, the log extracting unit 101d extracts log information based on the segment information and the time information that indicates when the log information is generated but can also extract log information based on the content information that identifies a content and the time information that indicates when the log information is generated. In this case, the log extracting unit 101d can display the "time designation window" after the content is designated at the "content designation window" shown in FIG. 13.

According to the third embodiment, the log extracting unit 101d of the multimedia terminal 100 receives designations for segment information that identifies a segment or content information that identifies a content, and time information that indicates when the log information is generated. It is then possible to selectively extract log information from the log DB 106b based on this information. The multimedia terminal 100 can then selectively extract log information for the content for a time desired by the user by receiving designations not only for segment information or content information but also for the time information that indicates when the log information is generated.

Fourth Embodiment

In a fourth embodiment, in addition to a designation of the segment, the log extracting unit of the multimedia terminal receives a designation of the content being outputted or the outputted content at the designated segment. Other aspects of the configuration of the fourth embodiment are the same as for the first embodiment.

In addition to the segment identifier and the content identifier, the log extracting unit 101*d* reads out the output time of the content from the correlation table 106*a*. The log extracting unit 101*d* receives designations of the segment identifier and the content identifier based on the read-out information. In this example, a designation of a segment is received, and then a designation for either of contents that are being outputted or contents that were outputted at the received segment is received.

Figure 17A:
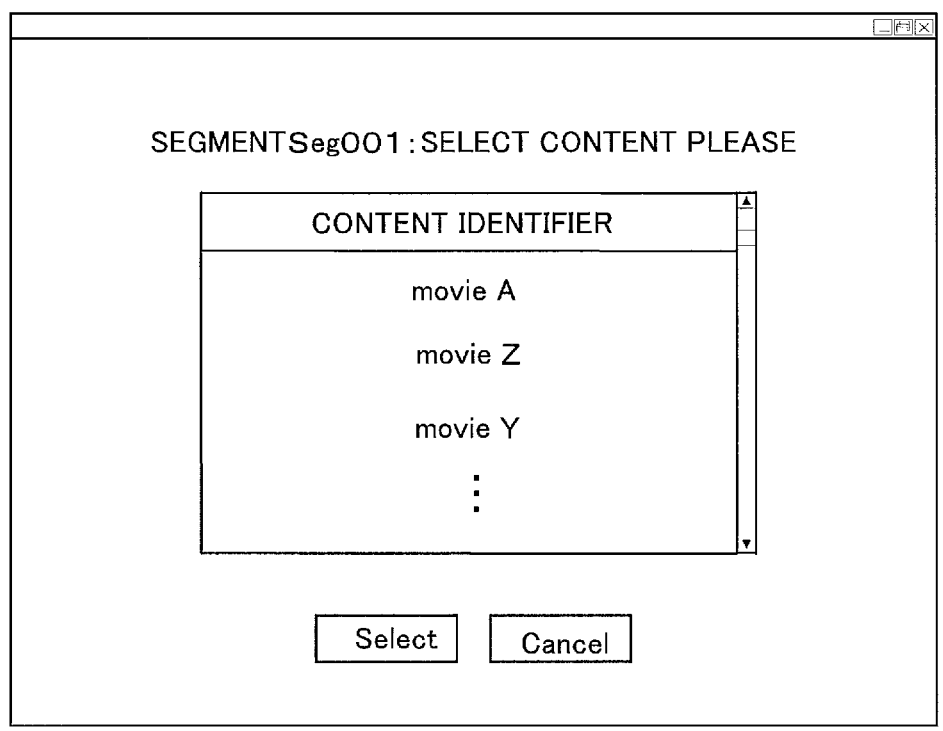
FIG. 17A shows an example of a content designation window in accordance with a fourth embodiment of the present invention.
Figure 17B:
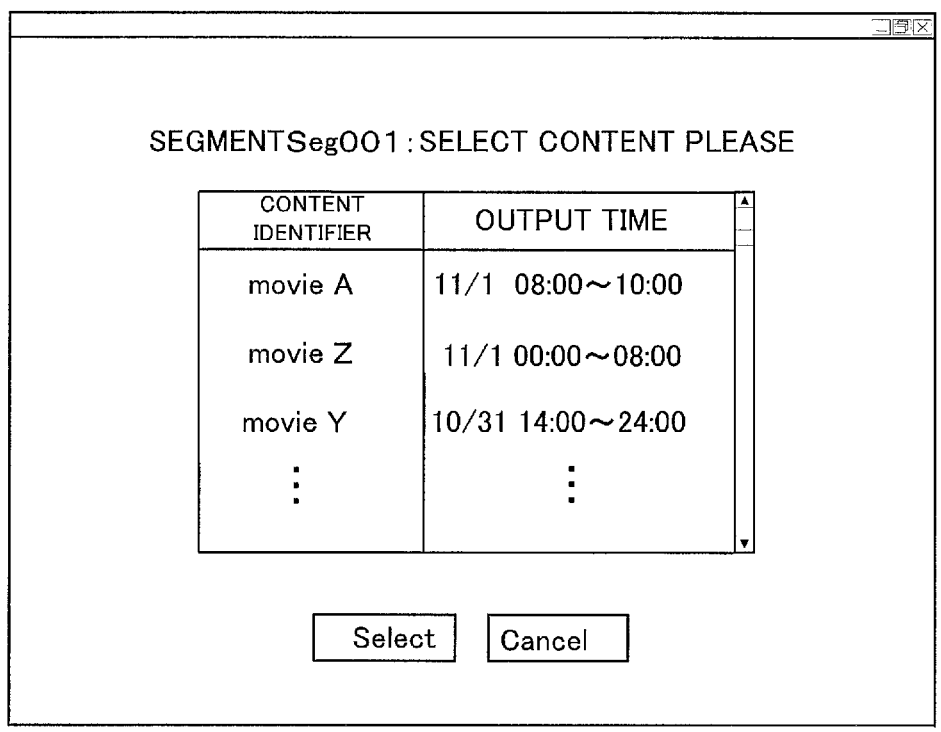
FIG. 17B shows a further example of a content designation window in accordance with the fourth embodiment of the present invention.

FIG. 17A and FIG. 17B show examples of a "content designation window" displayed by the log extracting unit 101*d* in accordance with the fourth embodiment. The "content designation window" of FIG. 17A shows "content identifiers" correlated to the designated segment "Seg001". In addition to the "content identifiers", the "content designation window" of FIG. 17B further shows a correspondingly assigned "output time" that is a content output time.

Referring to FIG. 17A and FIG. 17B, it is also possible to display the "content designation window", for example, after a segment is designated at the "segment designation window" shown in FIG. 9. In this example, the content identifiers of the contents being outputted or that were outputted at the designated segment "Seg001" are then displayed in the new order. The case is considered here where, for example, the content "movie Z" is designated. The log extracting unit 101*d* extracts records that include the segment "Seg001" and the content "movie Z" from within the log information of the log DB 106*b*. The log display unit 101*e* outputs log information based on the extracted records and displays the log information at the display 300. As a result, the user is able to refer to the log information not just of a content currently being outputted, but also of a content outputted in the past every segment.

The log extracting unit 101*d* can also receive a designation of, for example, a "segment identifier" and "output time" that is the time of outputting the content and extract a record from within the log information for the log DB 106*b*. Further, for example, a designation of a "content identifier" is received. It is then possible to extract the log information by receiving a designation of a "segment identifier" from the log information including the received "content identifier". Moreover, it is also possible that a plurality of "output time" is displayed for the same "content identifier" and a designation of any of the "output time" is received. The user is then capable of selectively looking at the log information for a content displayed at a certain segment using the content output time.

The log extracting unit 101*d* is further capable of selecting log information passed over to the log display unit 101*e* using the "priority level". For example, it is also possible to extract log information having a priority level of "error". It is also possible to extract log information that is a combination of the "priority level" and the "segment identifier", the "content identifier", and/or the "output time".

In the fourth embodiment, the log extracting unit 101*d* for the multimedia terminal 100 extracts log information based on a combination of the "segment identifier", the "content identifier", the "output time", and/or the "priority level". The multimedia terminal 100 is also capable of selectively displaying just log information for the desired content outputted at the designated segment by receiving designations for the "segment identifier" and the "content identifier" even in cases where successively different contents are outputted at a certain segment.

Similarly, the multimedia terminal 100 is also capable of selectively displaying portions of the log information corresponding to designated output time by receiving not only a designation for the "segment identifier" but also a designation of "output time" of a content even when the same content or successively different contents is/are outputted at the same segment.

It is also possible to further selectively extract and display portions of log information corresponding to a designated "output time" from log information corresponding to a designated "segment identifier" or log information corresponding to a designated "content identifier" even in cases where the same content is continuously outputted at the same segment. This is achieved by the multimedia terminal 100 receiving designations for the "segment identifier" or "content identifier", and the "output time".

Further, it is also possible for the multimedia terminal 100 to selectively display only important log information, for example, log information regarding system damage or hardware damage, using the priority level. The multimedia terminal 100 is also capable of selectively displaying log information desired by the user. This is achieved by receiving designations for appropriate combinations of "segment identifier", "content identifier", and/or "output time" at the priority level and extracting the log information.

Fifth Embodiment

In a fifth embodiment, the multimedia terminal performs output of the log information without an output designation by the user via the operation unit 600. In the fifth embodiment, the log extracting unit 101*d* specifies either of the segment identifier or the content identifier based on the priority level contained in the log information. Log information including any of the specified segment identifier and the content identifier is then extracted. Other aspects of the configuration of the fifth embodiment are the same as for the first embodiment.

The log extracting unit 101*d*, for example, refers to the log DB 106*b* at predetermined time intervals and determines whether or not a record including a predetermined priority level or higher is included. When records including a predetermined priority level or higher are present, the log extracting unit 101*d* classifies these records based on either of the segment identifiers or the content identifiers. The log extracting unit 101*d* can also refer to the log DB 106*b* at a predetermined time.

The log display unit 101*e* outputs the log window shown as examples in FIG. 11A and FIG. 11B for each of segments to display at the display 300. In addition to the priority level, other information contained in the extracted log information such as, for example, a segment identifier or a content identifier is displayed in the log window. In addition to the priority level, it is also preferable to display at least one of the segment identifier or the content identifier. Further, it is also preferable to display a log window for each of contents.

According to the fifth embodiment, the log extracting unit 101d of the multimedia terminal 100 refers to the log DB 106b and extracts log information including a predetermined priority level and higher. The log display unit 101e then displays the segment identifier and content identifier contained in this log information at the display 300 together with the priority level of the extracted log information. As a result, it is possible to extract log information desired by the user from a vast amount of log information for display at the display 300 without waiting for the user to make a log information output designation by setting which information is to be outputted in advance in addition to the desired priority level.

Sixth Embodiment

In a sixth embodiment, content outputted from the multimedia terminal can include, for example, not just video sequences, still images, and text, but also audio data. Further, the output destination for the content can include not just the display 300 but also a speaker 301. Other aspects of the configuration of the sixth embodiment are the same as for the first embodiment.

Figure 18:
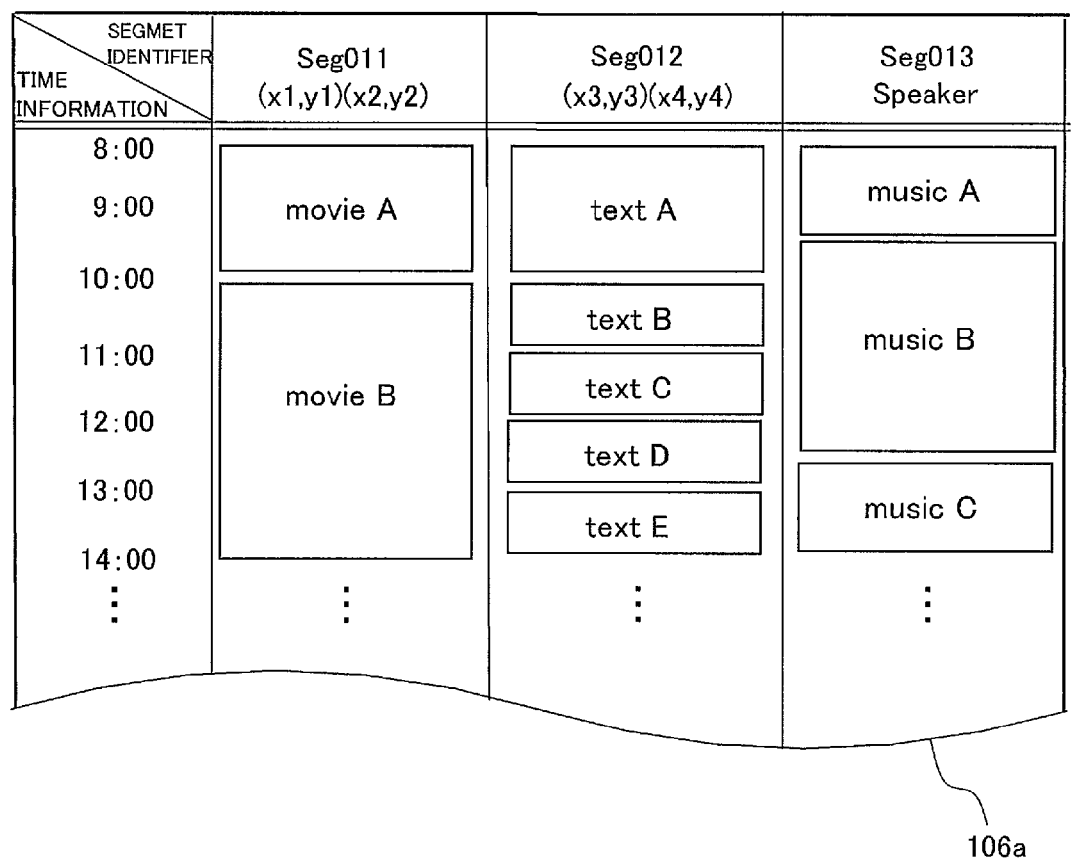
FIG. 18 is an illustration showing an example of a correlation table in accordance with a sixth embodiment of the present invention.

FIG. 18 shows an example of a correlation table in accordance with the sixth embodiment.

Referring to FIG. 18, a display region defined by coordinates (x, y) is allocated to the segments "Seg011", "Seg012", and content that can be identified visually such as video sequences is correlated. The speaker 301 is allocated to the segment "Seg013", and the content of the audio data is correlated.

Figure 19:
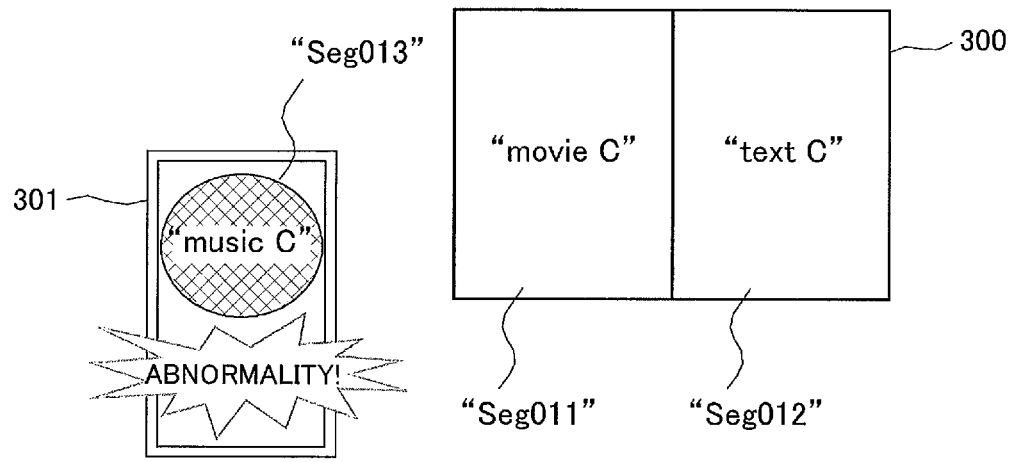
FIG. 19 shows a situation where a malfunction occurs for audio data content.

FIG. 19 shows a situation where a malfunction occurs in the output of the content "music C" of the audio data. Referring to FIG. 19, "movie C", and "text C" are displayed at segments "Seg011" and "Seg012" respectively of the display 300. A situation where a malfunction occurs in the output for "music C" is then shown while "music C" is allocated to "Seg013" (speaker 301).

Figure 20:
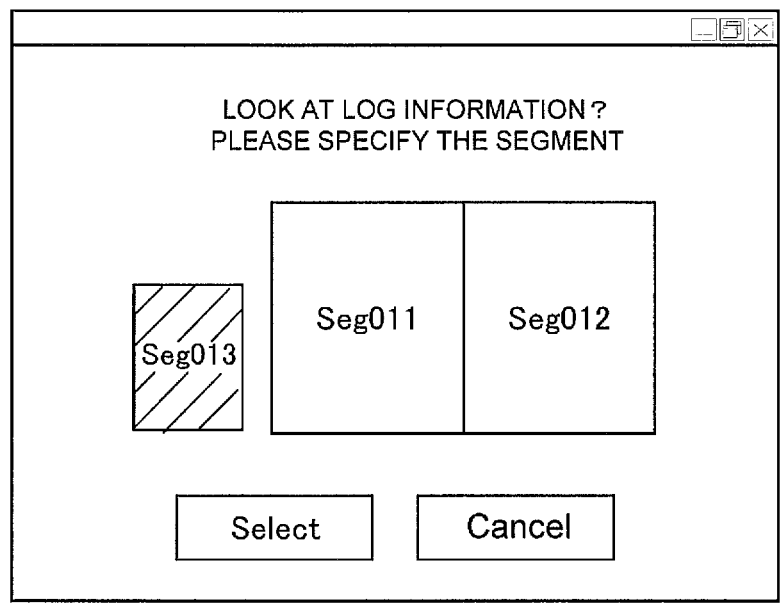
FIG. 20 shows an example of a segment designation window designating an audio data segment.

FIG. 20 is an example screen showing a situation where a malfunction occurs in the output of audio content.

Referring to FIG. 20, this screen has a dual function as a "confirmation window" for confirming the intention of the user as to whether or not to look at log information at the same time as notification of a malfunction, and a "segment designation window" that receives a segment designation. The flow of the screen transition and processing after the segment is designated is the same as for the first embodiment.

When a malfunction occurs in the content output for the audio data, notification can be given of the occurrence of malfunction using a predetermined notification sound. In this event, the "confirmation window" exemplified in FIG. 8 is displayed in response to a predetermined user input. It is then possible to display log information in response to a segment designation by then executing the same processing as in the first embodiment.

Further, in this example, the segment is specified in order to extract log information but it is also possible to specify a content. In this case, the same processing as in the second embodiment is executed. Records including a designated content identifier are then extracted. Some or all of the records or the newest information is then displayed at the display 300.

According to the sixth embodiment, it is also possible to allocate segment information for identifying a segment not only to content that can be detected visually but also to audio data that does not have an output region at the display 300. The multimedia terminal 100 receives a designation for content information that identifies audio content and/or a designation for segment information that identifies a speaker 301 from the user. It is then possible to selectively extract log information containing specified information from the log DB 106b for output at the display 300. It is therefore possible for the user to selectively refer to log information for audio data outputted at a desired segment from within a vast amount of log information not just for contents that can be confirmed visually such as video sequences, still images, and text, but also for when audio data that cannot be confirmed visually is outputted in parallel at each of segments.

Other Embodiments (A) In the first embodiment, the case of the multimedia terminal 100 acquiring content from the server 200 is shown but does not have to be the case as long as it is possible to acquire the content from the multimedia terminal 100. For example, the content can be stored in a storage region within the multimedia terminal 100 or can be stored in an external storage device. Further, the content can also be stored on a content database that can be accessed from a multimedia terminal 100 via a network or can be stored on other network resources.

(B) In the first embodiment, the case of the multimedia terminal 100 outputs the contents distributed from only one server 200 to the display 300 is shown, but the multimedia terminal 100 can output the contents distributed from a plurality of the servers 200 to the display 300. For example, the multimedia terminal 100 connects to a plurality of the servers 200 and acquires different contents from each of the servers 200 to output to the display 300. Further, the multimedia terminal 100 can be provided with a display and/or an operation unit.

(C) The multimedia terminal 100 can be any terminal that can output a plurality of contents to corresponding segments. The multimedia terminal 100 can also be a terminal that can output a plurality of contents to corresponding segments at corresponding times. For example, use as an information terminal for automatically playing back descriptive images for exhibitions and lessons in art galleries, museums, tutoring schools, etc. is also possible. These can also be unitary image playback devices such as, for example, DVD playback devices.

(D) The timing of the output of log information of the present invention is not limited to the case where malfunction occurs in the content output. For example, it is also possible for the log display unit 101d to receive a designation for displaying the "segment designation window" or the "content designation window" at any time via the operation unit 600 (refer to FIG. 2). In cases where it is wished to is referred to log information regardless of the occurrence of malfunction in the content output, the user can easily refer to the log information by designating any of a segment and a content that is wished to be referred to.

(E) A computer program that can execute the above method on a computer and a computer-readable recording medium recorded with this program are included within the range of the present invention. For example, a flexible disc, a hard disc, a CD-ROM, an MO, a DVD, a DVD-ROM, a DVD-RAM, a BD (Blu-ray Disc), and a semiconductor memory can be given as computer-readable recording media.

This computer program is not limited to being recorded on a recording medium and can also be transmitted via an electrical communication line, a wireless or wired communication line, or via a network typified by the Internet, etc.

(F) In the first to fifth embodiments, the contents that can be visually detected such as video sequences, still images, and text can also further include data that can be detected by ear such as audio etc. In this event, it is possible for a speaker at a certain output device to be a segment.

INDUSTRIAL APPLICABILITY

The present invention is applicable to all apparatuses that output content.

The invention claimed is:

1. An apparatus for displaying log information, comprising:
   a receiving unit configured to receive multimedia content and correlation information, the correlation information for associating each of a plurality of segments formed at a display;
   an output unit configured to output at least one multimedia content to each of the plurality of segments based on the correlation information, each segment being a display region, formed at a part of the display, where the output multimedia content is displayed; and
   a processor configured to:
      generate the log information including segment information and content information, the log information representing content output history, the segment information identifying each of the plurality of segments, and the content information identifying each of the at least one multimedia content, wherein the content output history comprises malfunction information representing a malfunction in displaying the multimedia content in a correlated segment;
      present a segment designation window at the correlated segment, the segment designation window configured to receive a user selection of the segment having the malfunction in displaying the multimedia content;
      receive a designation of the correlated segment;
      extract part of the log information based on the received correlated segment information;
      output for display the extracted log information for the correlated segment.

2. The apparatus according to claim 1, wherein the processor is configured to generate log information further including time information indicating a time of generation of the log information, and further extract part of the log information based on the time information.

3. The apparatus according to claim 1, wherein the correlation information includes output time information indicating a predetermined time of outputting each of the at least one multimedia content, and being correlated to each of the plurality of segments and each of the at least one multimedia content;
   the processor is further configured to:
      output the at least one multimedia content to each of the plurality of segments at the predetermined time; and
      extract the generated log information based on the output time information.

4. The apparatus according to claim 1, wherein the processor is configured to extract part of the log information further based on a priority level, and
   output at least either of segment information or content information included in the extracted log information together with the priority level.

5. A method for displaying log information, comprising steps of:
   receiving content and correlation information, the correlation information for associating each of a plurality of segments formed at a display;
   outputting at least one multimedia content to each of the plurality of segments based on the correlation information, each segment being a display region, formed at a part of the display, where the outputted content is displayed;
   generating the log information including segment information and content information, the log information representing content output history, the segment information identifying each of the plurality of segments, and the content information identifying each of the at least one multimedia content, wherein the content output history comprises malfunction information representing a malfunction in displaying the multimedia content in a correlated segment;
   presenting a segment designation window at the correlated segment, the segment designation window configured to receive a user selection of the segment having the malfunction in displaying the multimedia content;
   receiving a designation of the correlated segment;
   extracting part of the log information based on the received designation of the correlated segment;
   outputting for display the extracted log information for the correlated segment.

6. The method for displaying log information according to claim 5, wherein the log generating step generates log information further including time information indicating a time of generation of the log information; and
   the extracting step further extracts part of the log information based on the time information.

7. The method for displaying log information according to claim 5, wherein the correlation information includes output time information indicating a predetermined time of outputting each of the at least one multimedia content, and being correlated to each of the plurality of segments and each of the at least one multimedia content;
   the outputting step outputs the at least one content to each of the plurality of segments at the predetermined time; and
   the extracting step further extracts the generated log information based on the output time information.

8. The method for displaying log information according to claim 5, wherein the extracting step extracts part of the log information based on a priority level, and
   the outputting step outputs at least either of segment information or content information included in the extracted log information together with the priority level.

9. A computer program product comprising instructions on a nontransitory computer readable medium, the instructions causing a computer to execute the steps of:
   receiving content and correlation information, the correlation information for associating each of a plurality of segments formed at a display;
   outputting at least one multimedia content to each of the plurality of segments based on the correlation information, each segment being a display region, formed at a part of the display, where the outputted multimedia content is displayed;
   generating log information including segment information and content information, the log information representing multimedia content output history, the segment information identifying each of the plurality of segments, and the content information identifying each of the at least one multimedia content, wherein the content output history comprises malfunction information representing a malfunction in displaying the multimedia content in a correlated segment;

presenting a segment designation window at the correlated segment, the segment designation window configured to receive a user selection of the segment having the malfunction in displaying the multimedia content;

receiving a designation of the correlated segment;

extracting part of the log information based on the received designation of the correlated segment information;

outputting output for display the extracted log information for the correlated segment.

10. A system for displaying log information, comprising:

a correlation generating unit for generating correlation information that correlates each of a plurality of segments formed at a display;

an output unit configured to output at least one multimedia content to each of the plurality of segments based on the correlation information, each segment being a display region, formed at a part of the display, where the outputted multimedia content is displayed; and a processor configured to:
generate the log information including segment information and content information, the log information representing content output history, the segment information identifying each of the plurality of segments, and the content information identifying each of the at least one content, wherein the content output history comprises malfunction information representing a malfunction in displaying the multimedia content in a correlated segment;

present a segment designation window at the correlated segment, the segment designation window configured to receive a user selection of the segment having the malfunction in displaying the multimedia content;

receive a designation of the correlated segment;

extract part of the log information based on the received designation of the correlated segment;

output the extracted log information for the correlated segment.

11. The system of claim 10, wherein the extracted part of the log information is a most recently generated log entry extracted based on the user selection.

12. The system of claim 11, wherein the processor is further configured to provide a selectable display option, which when selected causes additional log entries that comprise the received selection to display.

13. The system of claim 10, wherein each of the plurality of segments at the display is associated with content of a different media format.

14. The system of claim 10, wherein the processor is further configured to receive a selection of time information in addition to the received selection of the display region, wherein the time information indicates a time that a content is output to a display region.

15. The system of claim 10, wherein the processor is further configured to:
present selectable criteria to a user, wherein the selectable criteria comprises each of the plurality of segments of the display.

16. The system of claim 10, wherein the processor is further configured to:
present selectable criteria to a user, wherein the selectable criteria comprises content associated with the plurality of segments formed at the display.

17. A method for displaying log information, the method comprising:
providing a plurality of display regions on a display for displaying content of different media formats;

associating each of the plurality of display regions with a content, wherein the association indicates which content is to output to which display region, wherein the associated content comprises multimedia content;

generating log information for the plurality of display regions, wherein the log information comprises the plurality of display regions and content associated with the plurality of display regions and content output history, wherein the content output history comprises malfunction information representing a malfunction in displaying the multimedia content in an associated display region;

presenting a display region designation window at the associated display region, the display region designation window configured to receive a user selection of the display region having the malfunction in displaying the multimedia content;

receiving a selection of the associated display region;

extracting, from the log information, a portion of the log information based on received selection of the associated display region;

outputting the extracted portion of the log information for display for the associated display region.

18. The method of claim 17, wherein the extracted portion of the log information is a most recently generated log entry extracted based on the received selection.

19. The method of claim 18, further comprising providing a selectable display option, which when selected causes additional log entries that comprise the received selection to display.

20. The method of claim 17, wherein each display region of the plurality of display regions is associated with content of a different media format.

21. The method of claim 17, further comprising receiving a selection of time information in addition to the received selection of the display region, wherein the time information indicates a time that a content is output to a display region.

22. The method of claim 17, further comprising:
presenting selectable criteria to a user, wherein the selectable criteria comprises each of the plurality of display regions.

23. The method of claim 17, further comprising:
presenting selectable criteria to a user, wherein the selectable criteria comprises content associated with the plurality of display regions.

* * * * *